Jan. 1, 1924
K. ARMSTRONG
EMERGENCY AXLE SPINDLE
Filed March 27, 1923
1,479,273
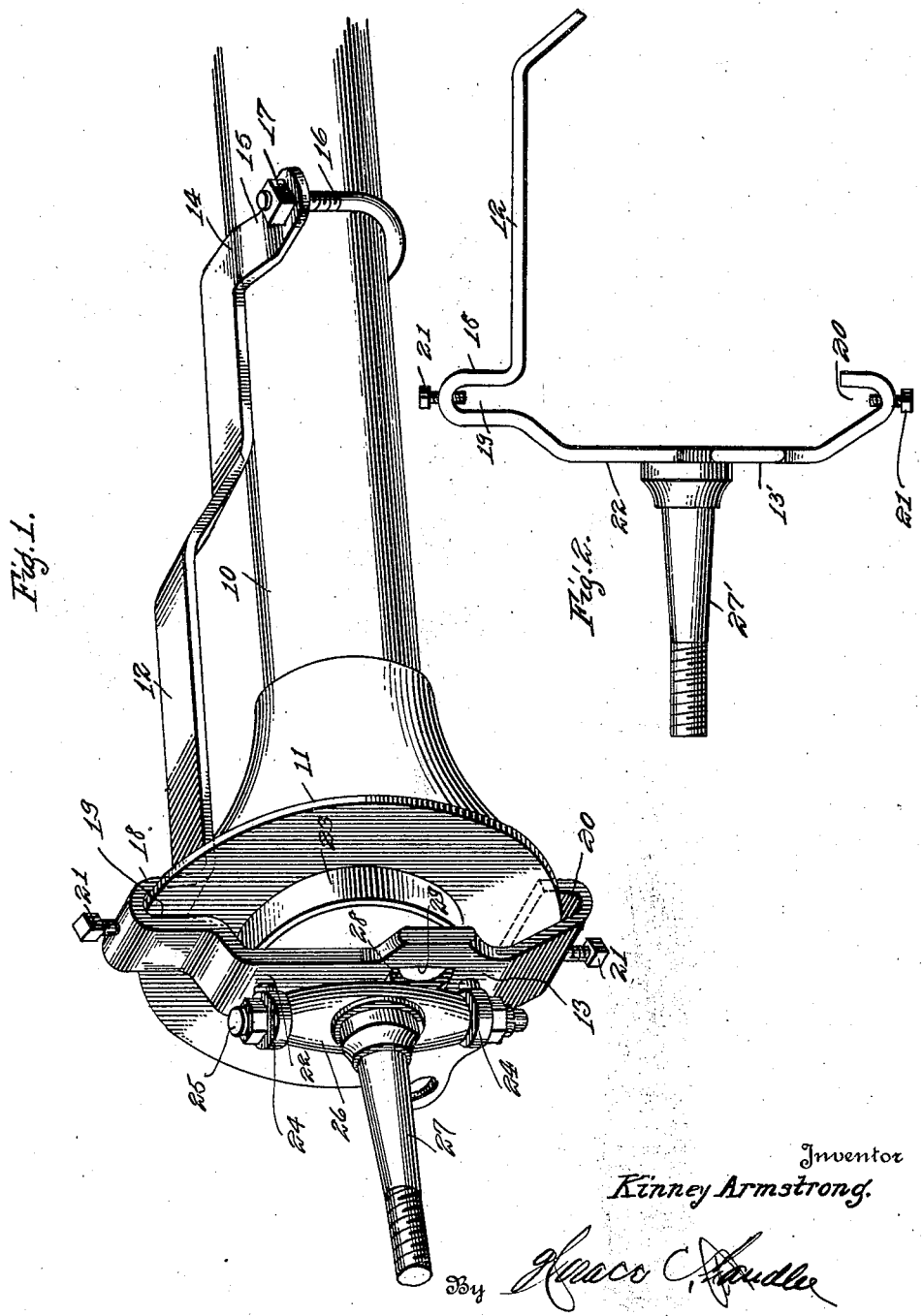
Inventor
Kinney Armstrong.
By [signature]
Attorney Patented Jan. 1, 1924.

1,479,273

UNITED STATES PATENT OFFICE.

KINNEY ARMSTRONG, OF FAYETTEVILLE, ARKANSAS.

EMERGENCY AXLE SPINDLE.

Application filed March 27, 1923. Serial No. 628,098.

*To all whom it may concern:*

Be it known that I, KINNEY ARMSTRONG, a citizen of the United States, residing at Fayetteville, in the county of Washington, State of Arkansas, have invented certain new and useful Improvements in Emergency Axle Spindles; and I do hereby declare the following to be a full, clear, and exact description of the invention, such as will enable others skilled in the art to which it appertains to make and use the same.

This invention relates to new and useful improvements in emergency repair devices, and particularly to devices of this character which are adapted for use in connection with automobiles.

One object of the invention is to provide a device which can be clamped onto the rear axle of an automobile, for the purpose of providing an emergency spindle for supporting a wheel in the place of a broken one.

Another object is to provide a device of this character which is simple in construction, strong and durable, and which can be readily and quickly applied to an automobile for the purpose of holding a wheel to support the automobile while it is being towed.

Other objects and advantages will be apparent from the following description when taken in connection with the accompanying drawing.

In the drawing:

Figure 1 is a perspective view of a portion of a rear axle of an automobile, showing the invention applied thereto, but without showing the wheel.

Figure 2 is a side elevation of a portion of the device, showing a modification wherein the wheel spindle is integral with the attaching clamp.

Referring particularly to the accompanying drawing, 10 represents the rear axle housing which has the brake band supporting flange 11 thereon, and in connection with which the present invention is particularly adapted for use.

The attachment includes a substantially L-shaped member having the longer arm 12 and the shorter arm 13. The arm 12 is offset adjacent its inner end, and the end 14 of the arm is provided with laterally extending ears 15. A U-bolt 16 has its legs disposed through openings in the said ears. The lower face of the arm, between the ears, is transversely curved to snugly fit on the upper curved face of the axle housing, as clearly seen in Figure 1, while the U-bolt 16 engages beneath said housing, to be held by the nuts 17 which are engaged on the upper ends of the legs of the bolt. The longer arm 12, adjacent its junction with the shorter arm, is formed with an upward offset portion 18, in which is formed a transverse recess 19, for the purpose of receiving the upper edge portion of the flange 11, of the axle housing. The lower end of the arm 13 is bent to form a similar recessed portion 20, for receiving the lower edge portion of the flange 11. A binding screw 21 is disposed through each of these recessed portions 18 and 20 for biting engagement in the edge of the flange 11, to retain the arm 13 in proper position on the disk. The arm 13, intermediate its ends, is offset, as shown at 22, for the purpose of escaping the central boss 23, of the disk. Extending from the outer face of this offset portion 22, and adjacent the upper and lower ends thereof, are the apertured ears 24, for receiving the bolt or pivot pin 25, of the spindle 26, of a front axle stub 27. The eye 28, of the spindle 26, is disposed through an opening 29, formed in the lower portion of the offset part of the shorter arm 13, whereby to prevent the spindle from rotating on the bolt 25.

The device is particularly designed for use in connection with an automobile where the end of the rear axle has been broken off, and to permit a replacement wheel to be properly supported so that the automobile may be easily towed, and without the use of the ordinary crane.

In applying the device, the brake band of the rear axle is removed leaving only the flange 11 and the boss 23 on the axle housing. The device is then applied in the manner shown in Figure 1, and clamped in position by means of the screws 21 and the U-bolt 16. The stub axle 27 is then in position to receive thereon the hub of the replacement wheel, thus permitting the automobile to be easily towed. The use of a front axle stub permits the application of a front axle stub of the particular make of automobile being used on the one L-shaped member, whereby when a call is made to tow a car, the information is given as to the make of the car, when the repairman will attach the proper make of front axle stub to the L-shaped member and take the device together with the appropriate front wheel of that make of automobile to the stranded car. The above refers to automobiles wherein the front and rear wheels are interchangeable.

In automobiles wherein the front and rear wheels are not interchangeable, it is necessary to provide for the particular kind of rear axle end. In this case the axle end, or stub which is to be used, will be formed integrally with the shorter arm 13', as clearly seen at 27', in Figure 2, and designed for the particular make of car. Also, the opening 29 is obviated, as there will be no need for the same. Otherwise the construction is the same as that shown in Figure 1.

What is claimed is:

1. A replacement rear axle end comprising a substantially L-shaped member the longer arm of which is provided with means for clamping engagement with the rear axle housing of an automobile, the end of the shorter arm and the portion of the longer arm opposite thereto being formed with brake-band disk receiving recesses, clamping means on the recessed portions, and a stub axle carried by the said shorter arm.

2. A replacement rear axle end comprising an angle member having an arm provided with means for clamping engagement with the housing of an axle, an arm arranged to lie transversely of the brake disk of the axle housing and being centrally offset, said last-named arm having clamping means for engagement with the said disk, and a stub axle carried by the offset portion of said arm.

3. A replacement rear axle end comprising a substantially L-shaped member the longer arm of which is provided with means for clamping attachment to a rear axle housing, the shorter arm being arranged to lie transversely of the brake disk of said housing and having clamping means at each end for engagement with the edge portions of said disk, and a stub axle extending outwardly from the central portion of said shorter arm.

In testimony whereof, I affix my signature, in the presence of two witnesses.

KINNEY ARMSTRONG.

Witnesses:
R. E. NORRIS,
RUTH SKILLERN.